United States Patent [19]

Rankin

[11] Patent Number: 4,565,335

[45] Date of Patent: Jan. 21, 1986

[54] SIMULATED ANIMAL TOILET TISSUE HOLDER

[76] Inventor: Georgia A. Rankin, 3910 Hwy. 42-57, Sturgeon Bay, Wis. 54235

[21] Appl. No.: 648,675

[22] Filed: Sep. 10, 1984

[51] Int. Cl.$^4$ .......................................... B65H 19/00
[52] U.S. Cl. ................................. 242/55.2; 206/457; 150/52 D; D6/304; D6/523; D6/564; D21/159
[58] Field of Search ................ 242/55.2, 55.53, 55.54, 242/55.55; 434/86, 89; 206/457; 150/52 R, 52 D; D6/564, 598, 619, 523, 351, 359, 304; D21/74, 159

[56] References Cited

U.S. PATENT DOCUMENTS

| D. 83,297 | 2/1931 | Woolnough | D21/159 |
| D. 276,361 | 11/1984 | Hyman, Sr. | D6/359 X |
| 3,051,404 | 8/1962 | Ritchey | 242/55.2 |
| 3,420,412 | 1/1969 | Greene | 222/78 |

Primary Examiner—Leonard D. Christian
Attorney, Agent, or Firm—Fuller, House & Hohenfeldt

[57] ABSTRACT

A roll of toilet tissue held for rotation by the front legs of a simulated stuffed animal used for training a child to use the toilet. The stuffed animal is formed of a washable and soft animal fur simulating fabric and colored to simulate animal skin. The fabric supported and maintained in the shape of an animal with a frame mountable to a fixed surface. The frame may be either permanently or releasably mounted to vertical or horizontal surfaces.

10 Claims, 5 Drawing Figures

U.S. Patent   Jan. 21, 1986   Sheet 1 of 2   4,565,335
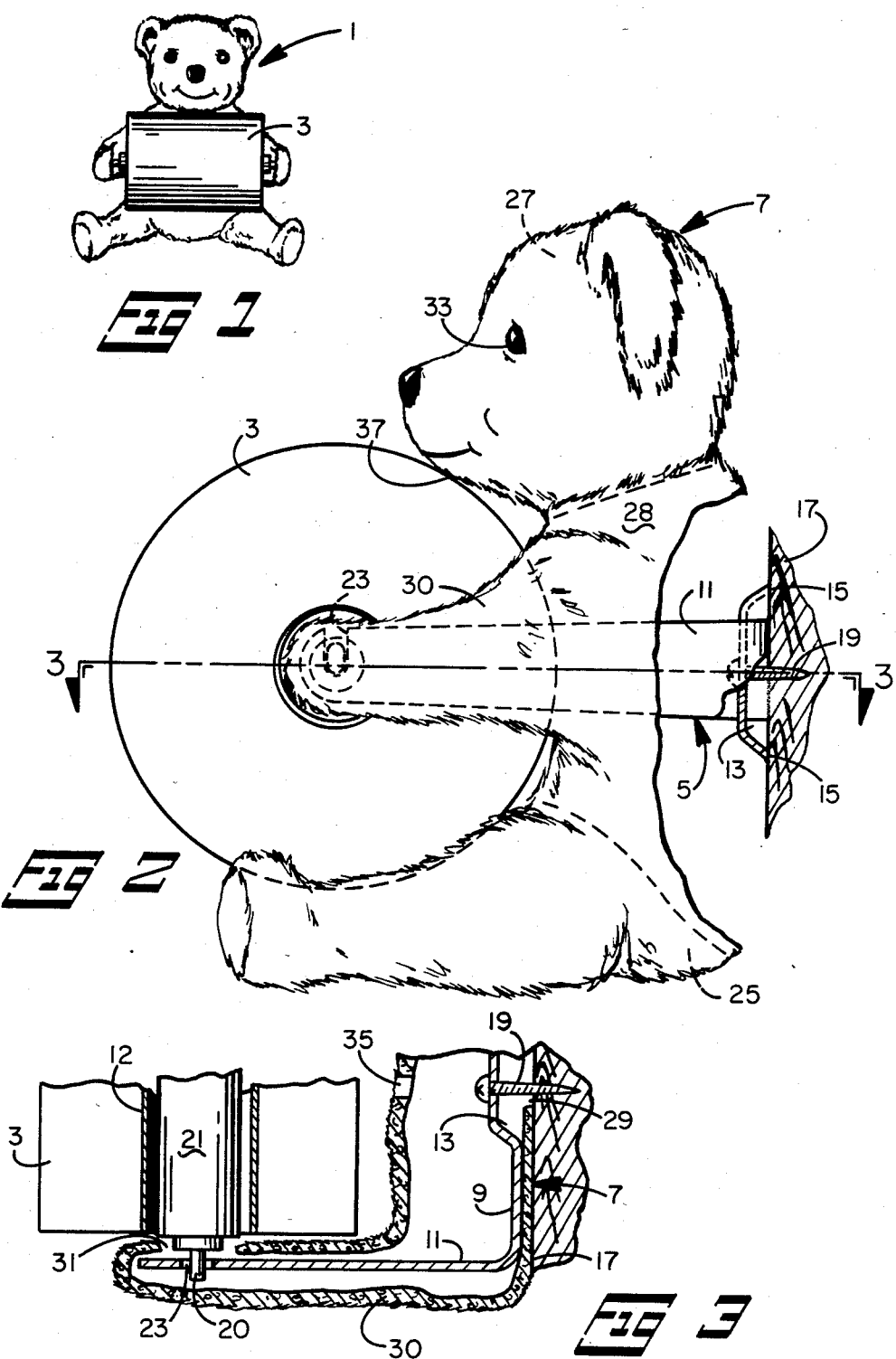

SIMULATED ANIMAL TOILET TISSUE HOLDER

BACKGROUND OF THE INVENTION

This invention pertains to paper holders, and more particularly to child-appealing dispensers of paper tissue.

Toilet training small children is often an irksome and time consuming task. Occasionally, such training instills tension and fear in the child. Reduction or elimination of child apprehension is believed to facilitate training. To that end, various diversions have been developed to help the child relax and thus train more easily. As far as is known, there is no training aid designed to amuse a child while enticing him or her to remove toilet tissue from a roll.

SUMMARY OF THE INVENTION

In accordance with the present invention, a paper tissue holder is provided which eases the toilet training of a small child. This is accomplished by apparatus which includes a frame for holding a conventional roll of tissue and a child-appealing stuffed animal.

The frame is designed to rotatably support the ends of the tissue roll. The frame further functions as a skeleton for supporting a fabric sewn in colored fake fur to simulate an animal. To enhance child appeal, the fabric is made from a warm and comfortable material. For sanitary purposes, the animal fabric is made of a commercially available material known as washable fake fur. It is easily removed from and reattached to the frame. The frame and fabric cooperate to form the front legs of the stuffed animal, and the front legs are positioned so that they hold the opposite ends of the tissue roll.

The frame may be manufactured for permanent mounting to a vertical surface, such as a wall or vanity. In a modified embodiment of the invention, the frame is manufactured with versatile mounting means for removably mounting the animal and tissue to either horizontal or vertical surfaces.

How the foregoing and other objects and advantages of the invention are achieved will be evident in its more detailed description of embodiments of the invention which now be set forth in reference to the accompanying drawings.

DESCRIPTION OF THE DRAWINGS

FIG. 1 is a perspective view of the new tissue holder that has the configuration of an animal;

FIG. 2 is a side view, partially broken away partially in section, of the tissue holder;

FIG. 3 is a sectional view taken along line 3—3 of FIG. 2;

DESCRIPTION OF A PREFERRED EMBODIMENT

Figure 4:
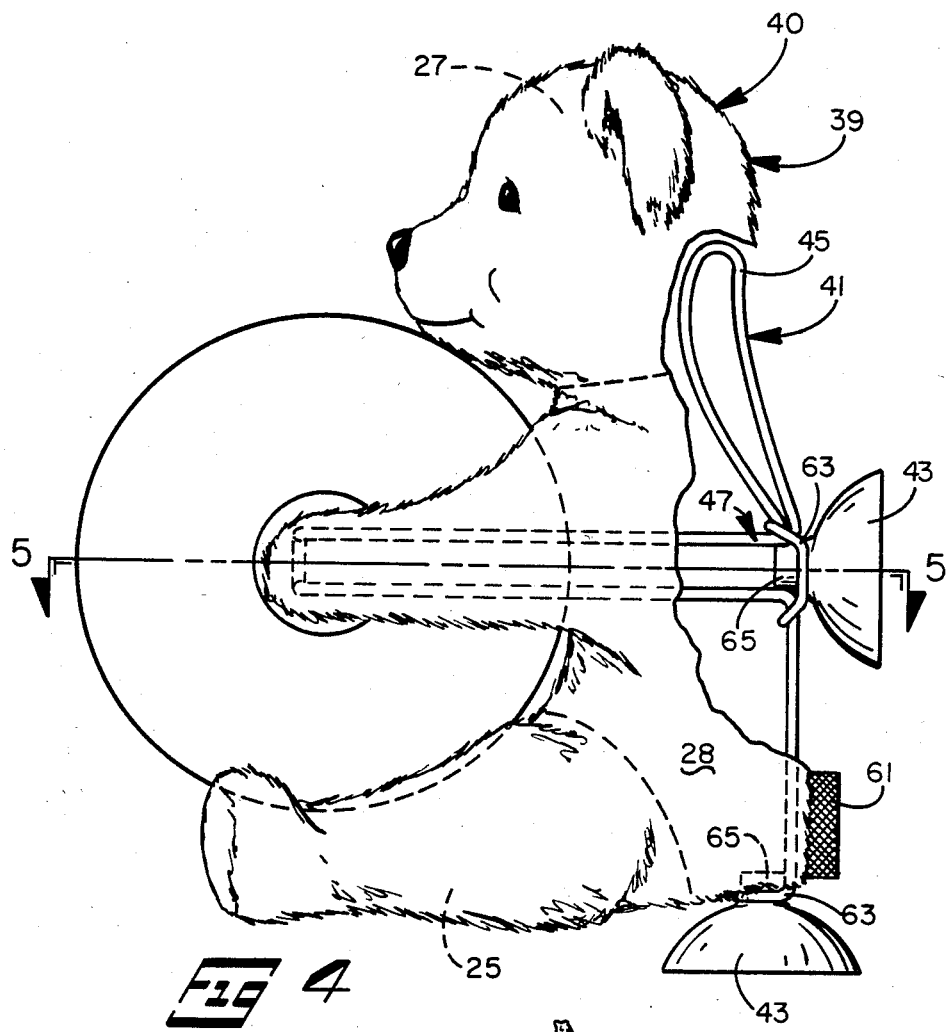
FIG. 4 is a side view, with parts broken away, of a modified embodiment of the invention.

FIG. 1 shows the new tissue holder 1 which simulates an animal holding a roll of tissue 3 for facilitating toilet training of small children and other individuals who may be in puerile condition.

The tissue holder 1 comprises a frame 5 covered with a flexible fabric 7 designed to simulate the skin of a child-appealing stuffed animal. In the construction illustrated in FIGS. 2 and 3, the frame 5 is formed as a generally U-shaped bracket having a base portion 9 may have an enlarged and recessed area 13 defined at the top and bottom by edges 15 for bearing against a vertical mounting surface 17. Screws 19 are used to mount the frame to the surface 17.

The outer end of each bar 11 is adapted to rotatably receive the end shafts or pins 20 of a toilet tissue roll supporting spindle 21. The roll of tissue 3 and tubular core 12 surround and are supported by the spindle, as is well known. To mount the spindle 21, one bar has a vertical slot 23 for accepting one spindle pin. The other bar has a round hole, not visible, at its outer end for accepting the other spindle pin in conventional fashion.

The fabric 7 is sewn in the configuration of the skin of a child-appealing animal. In the illustrated embodiment, the fake fur fabric is configured as a teddy bear, but it will be appreciated that the fabric can be cut and sewn to simulate numerous other animals. To maintain the shape of the legs and head of the fabric animal, the legs and head are stuffed, as at 25 and 27, respectively, with washable polyester fiber fill or similar pliable fibrous filling material. The torso 28 and front legs 30 of the animal fabric are not stuffed.

To permit insertion of the frame 5 into the fabric 7, the back side of the torso is left unsewn, so as to form a vertical opening 29. To accommodate the spindle pins 20, the fabric at the inside of the ends of each front leg 30 of the simulated animal is provided with an opening 31.

To mount the tissue holder 1, the frame 5 is loosely attached with screws 19 to a vertical surface such as a wall. The fabric 7, by means of torso opening 29, is slipped over the frame 5 and the fabric front legs 30 are positioned over the corresponding side bars 11. The fabric around the margins of the opening 29 is pulled between the frame base portion 9 and the vertical surface. Then the screws are tightened through inconspicuous slits 35 in the front of the fabric of the torso 28. Finally, the end pins 20 of spindle 21, with the tissue roll 3, are inserted through the front leg openings 31 and into the corresponding bar openings.

The stuffed head 27 is designed so that is is held in an upright attitude by a full roll 3 supporting chin 37. As the child uses the tissue and the roll diameter decreases, the flexible nature of the unstuffed torso fabric 28 permits the head to droop, thus providing further amusement to the child.

Figure 5:
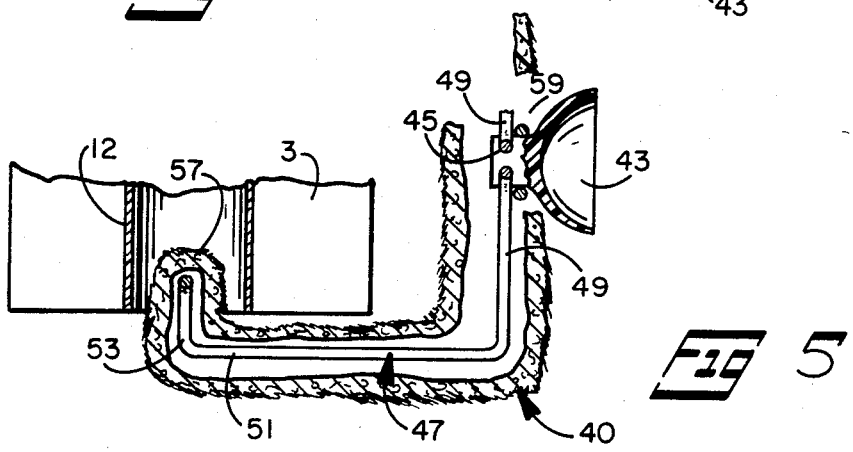
FIG. 5 is a sectional view taken along line 5—5 of FIG. 4.

FIGS. 4 and 5 depict a modified embodiment of the animal-like tissue holder of the present invention. In FIGS. 4 and 5, the tissue holder 39 comprises a skeleton-like frame 41, washable fake fur fabric 40, and a releasable mounting means 43. The frame 41 is formed with an upright member 45 which simulates a spine and a pair of horizontal members 47 which simulate an animal's front legs. The upright member 45 extends from the lowermost portion of the torso 28 to a short distance into the stuffed head 27. The horizontal members 47 include a first pair of bars 49 which are joined to the upright member 45 and which project laterally and generally colinearly therefrom. Each bar 49 blends into a forwardly extending bar 51, which in turn terminates in a short inwardly turned bar 53.

The frame 41 may be made from a variety of materials and in a variety of configurations, as, for example, elongated strips or rods of steel or other metals. The strips may be welded or bent to form the desired configuration. The frame may also be made from a molded plastic material. In the illustrated structure, the frame is made of heavy wire that is looped and bent. In that construction, steel wire is suitable.

The fabric 40 used in the animal-like tissue holder 39 is similar to that previously described. However, the portions of the fabric at the ends of the front leg 57 do not have openings. Rather, the roll of tissue paper 3 and its tubular core 12 are placed directly over the inturned bars 53, thereby eliminating the need for a tissue roll spindle and consequently the need for openings in the frame member and in the fabric front legs.

The fabric at the back of the torso 28 is left unsewn to create a vertical opening 59. The opening 59 may be partially closed by means of "Velcro" strips 61 extending between the mountings 43 and between the back mounting and the head 27.

The releasable mountings 43 are desirably suction cups 43. One cup is fastened to the back side of the frame 41 so that the animal-like tissue holder 39 may be held by suction to a vertical surface. A second cup is fastened to the lower end of the skeletal frame so that the animal tissue holder may be mounted to a horizontal surface. The means for mounting the cups to the frame is dependent upon the frame construction. For example, in the illustrated structure having a bent wire frame, the wires are bent with loops 63 which encircle and retain the hub portions 65 of the suction cups. Thus, the animal-like tissue holder of FIGS. 4 and 5 is portable so that it may accompany a child during many of his or her daily activities, but the holder can be fixed in a convenient location when it is desired to provide an incentive to the child to use the toilet.

Although some implementations of the inventive concept of using a simulated animal for holding a toilet tissue roll to induce acceptable toilet habits by a child are described in detail, such implementations are intended to be illustrative rather than limiting, for the invention may be variously embodied and is to be limited only by interpretation of the claims which follow.

I claim:

1. An aid for toilet training children comprising:
   a flexible fabric formed into the shape of an animal having a head, a torso, a pair of generally forwardly extending front legs, and a pair of hind legs;
   frame means for supporting the fabric to simulate the selected animal; said frame means including members inserted into parts of said fabric simulating one of said pairs of legs of the animal to support opposite ends of a roll of tissue paper between the legs in said one pair and the members therein; and
   mounting means for mounting the frame means to a selected mounting surface.

2. The toilet training aid according to claim 1 wherein the fabric is configured to simulate a teddy bear.

3. The toilet training aid according to claim 1 including pliable material stuffed in the head and hind legs of the animal.

4. An aid for toilet training children comprising:
   a flexible fabric formed into the shape of an animal having a head, a torso, a pair of generally forwardly extending front legs, and a pair of hind legs;
   frame means for supporting the fabric to simulate the selected animal;
   said frame means comprising a generally U-shaped member having a base portion and mounting means formed integrally with the base portion, and a pair of generally horizontal and parallel bars joined to the base portion and projecting forwardly therefrom, the front end of the bars having openings respectively, to receive opposite ends of a tissue paper roll supporting spindle; and
   the fabric at the end of each front leg defining an opening aligned with the respective opening in the bar to permit a tissue roll spindle end to pass through the fabric.

5. The toilet training aid according to claim 4 wherein the head of the fabric animal is supported by the tissue roll,
   so that the animal head is in an upright attitude when the roll is full and the head droops as tissue is removed from the roll.

6. The toilet training aid according to claim 3 wherein a portion of the fabric of the animal torso is interposed between the frame means and the mounting surface.

7. The toilet training aid according to claim 1 wherein the frame means comprises:
   a substantially vertical upright member extending between the lower end of the animal torso and the animal head to simulate the spine of the animal; and
   wherein said members that are inserted in said pair of legs are generally parallel horizontal members attached to the upright member.

8. The toilet training aid according to claim 1 wherein the mounting means is adapted to releasably mount the frame means to a selected vertical or horizontal mounting surface, so that the toilet training aid is portable to accompany the child in diverse activities.

9. The toilet training aid according to claim 7 wherein the mounting means comprises at least one suction cup fastened to the frame means.

10. The toilet training aid according to claim 7 wherein mounting means comprises first and second suction cups fastened to the upright member, the suction cups being adapted to releasably mount the frame means to a vertical and horizontal mounting surface, respectively.

* * * * *